(No Model.)  J. E. BLACKMORE.  5 Sheets—Sheet 1.
CAMERA.
No. 528,140.  Patented Oct. 30, 1894.
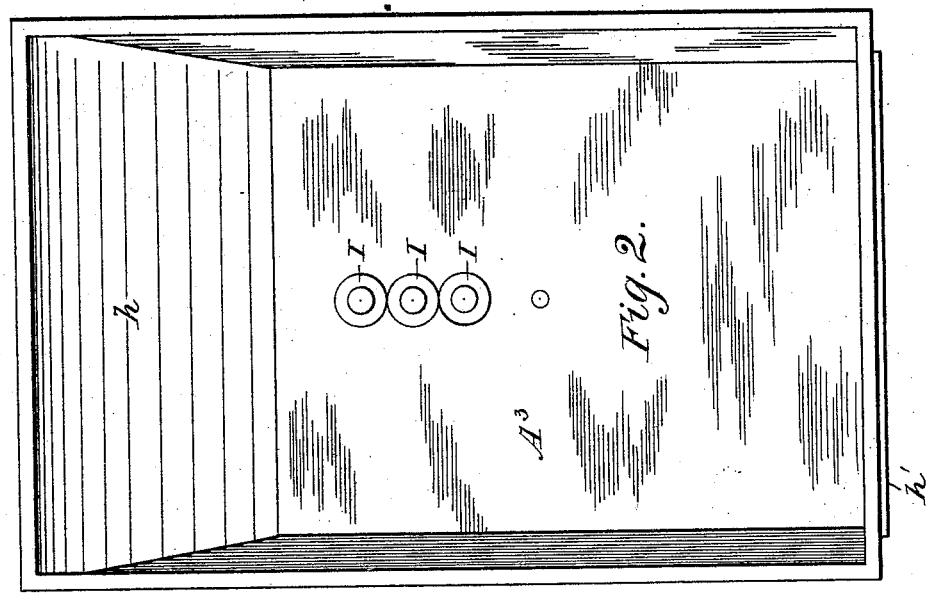
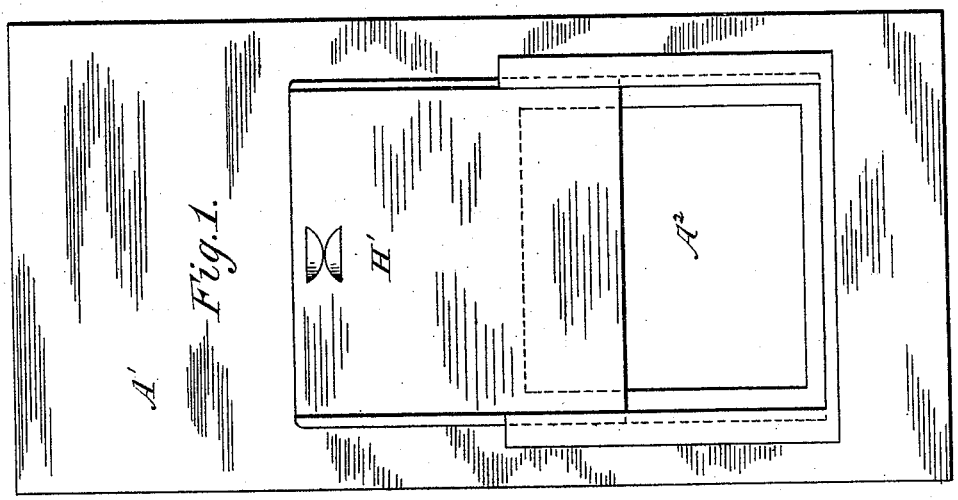
Attest:
L. Lee.
Edw. F. Kinsey.
Inventor.
James E. Blackmore,
per Crane & Miller, Attys.

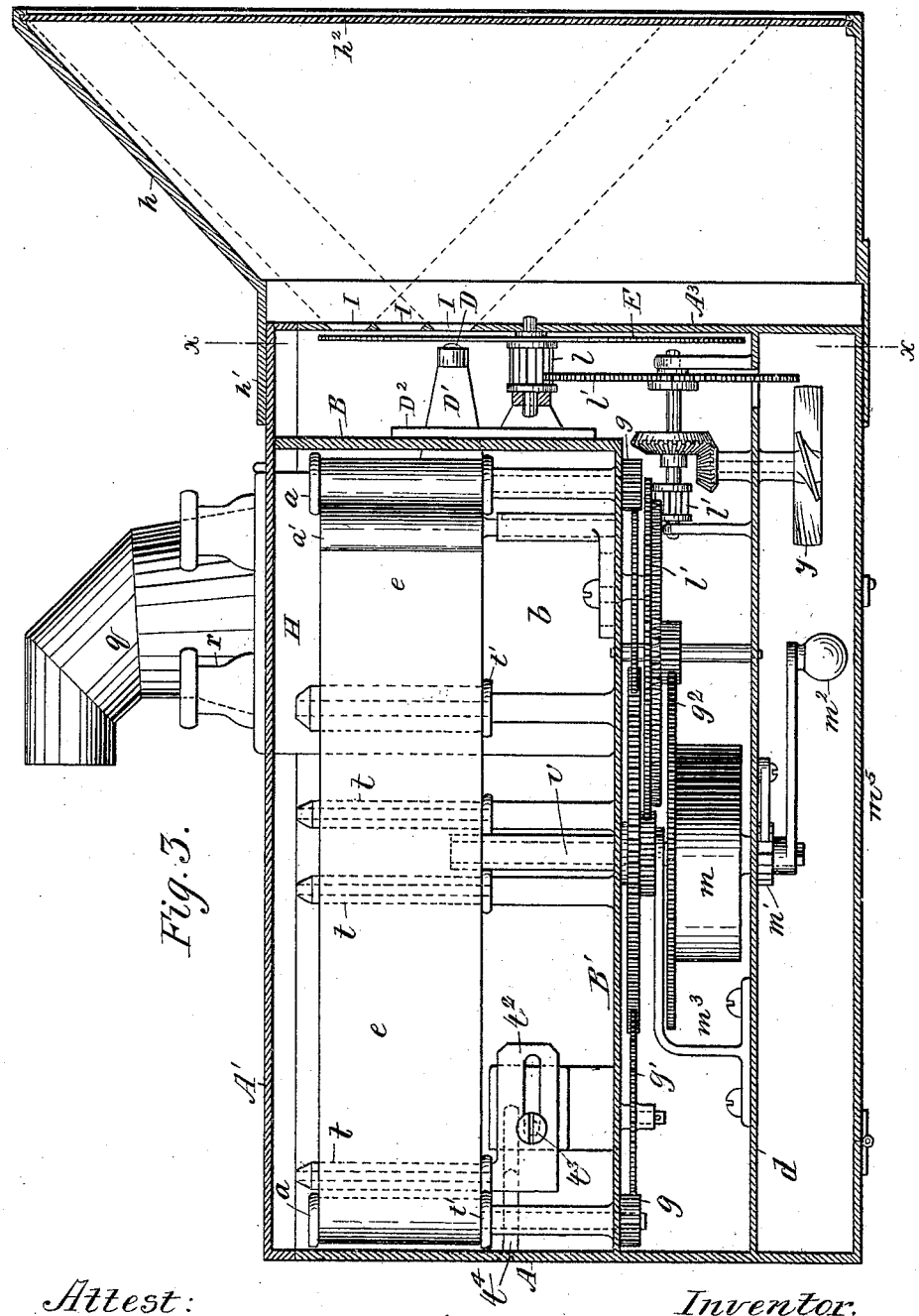

(No Model.) 5 Sheets—Sheet 3.
J. E. BLACKMORE.
CAMERA.

No. 528,140. Patented Oct. 30, 1894.

Attest: Inventor.
William Batson. James E. Blackmore,
John Sherman Henry J. Miller, Atty.

(No Model.)

J. E. BLACKMORE.
CAMERA.

No. 528,140.

5 Sheets—Sheet 4.

Patented Oct. 30, 1894.

Attest:
L. Lee.
Edw. P. Kinsey.

Inventor:
James E. Blackmore, per
Crane & Miller, attys.

(No Model.) 5 Sheets—Sheet 5.
J. E. BLACKMORE.
CAMERA.

No. 528,140. Patented Oct. 30, 1894.

Attest:
L. Lee.
Edw. F. Kinsey

Inventor.
James E. Blackmore,
per Crane & Miller, Attys

UNITED STATES PATENT OFFICE.

JAMES E. BLACKMORE, OF NEWARK, NEW JERSEY.

CAMERA.

SPECIFICATION forming part of Letters Patent No. 528,140, dated October 30, 1894.

Application filed December 14, 1892. Serial No. 455,120. (No model.)

*To all whom it may concern:*

Be it known that I, JAMES E. BLACKMORE, a citizen of the United States, residing at Newark, Essex county, New Jersey, have invented certain new and useful Improvements in Cameras for Photographing a Connected Series of Pictures of a Moving Object, fully described and represented in the following specification and the accompanying drawings, forming a part of the same.

This invention relates to a camera for taking numerous instantaneous photographs, in a connected series, of a moving object; and the invention consists partly in a movable lens holder adapted to be shifted transversely to the direction of motion of the film, partly in a revolving slotted shutter adapted to co-operate therewith in each of its several positions, and partly in means for protecting the successive portions of the film from indirect exposure to the light admitted through the lens.

The nature of the invention will be more fully understood by reference to the annexed drawings, in which—

Figure 4:
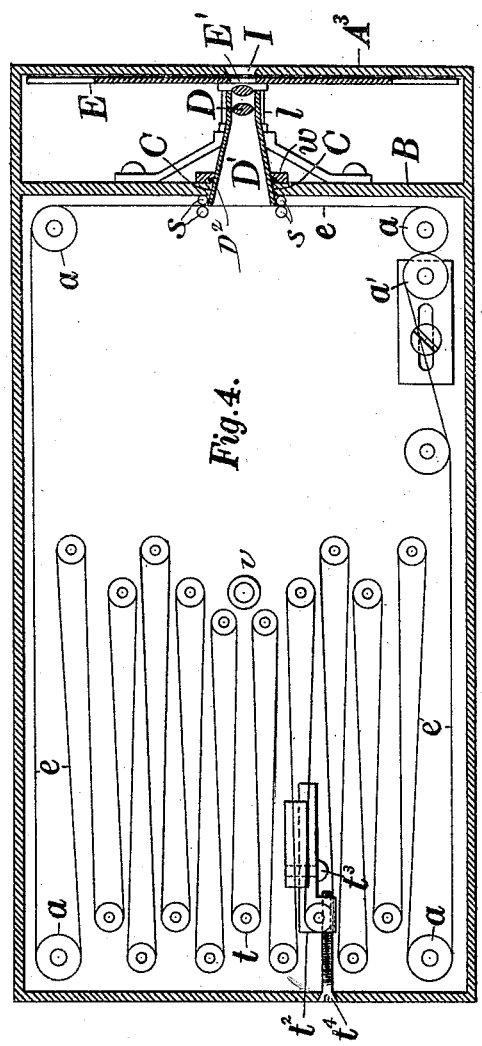
Figure 5:
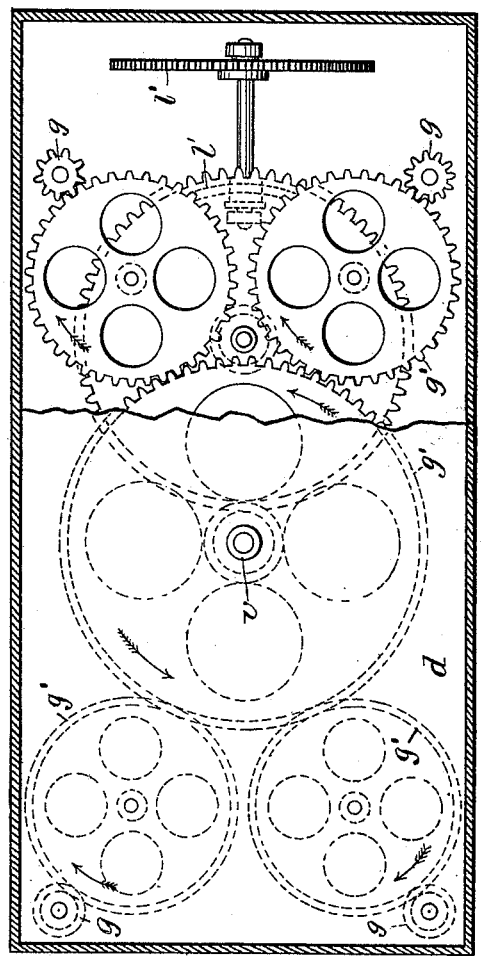
Figure 9:
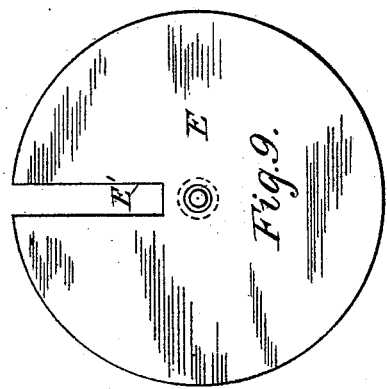
Figure 6:
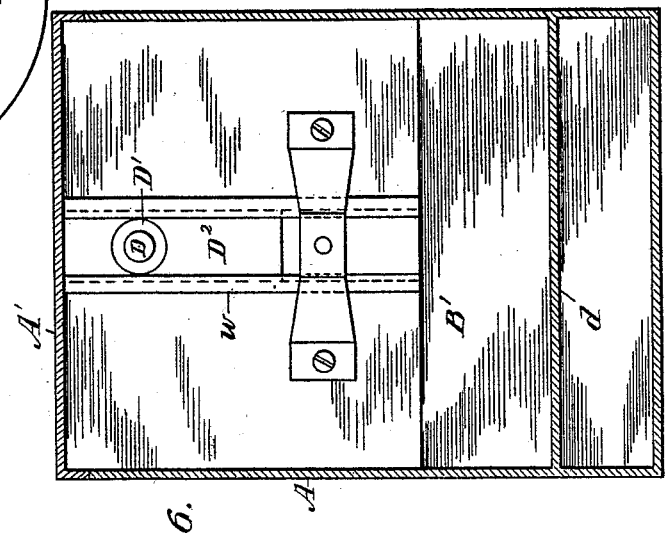
Figures 7, 8:
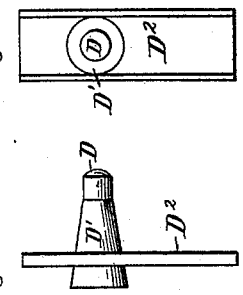

Figure 1 is a plan of the apparatus with the slide upon the cover A' partly withdrawn to expose the aperture $A^2$. Fig. 2 is a view of the front end of the casing. Fig. 3 is a side elevation of the apparatus with the nearer side of the casing removed to expose its contents. Fig. 4 is a sectional plan of the same showing the parts below the center line of the lens tube. Fig. 5 shows the bottom of the dark chamber with one end removed to expose the gearing underneath the same. Fig. 6 is a transverse section of the casing on line $x\,x$ in Fig. 3. Fig. 7 is a side view and Fig. 8 a front view of the lens tube detached from the casing; and Fig. 9 is a front view of the shutter disk.

A is the casing provided with a removable cover A' having an aperture $A^2$ to admit a lantern H (Fig. 3) when it is desired to convert the apparatus into a magic lantern; which aperture has a slide H' to close the same when the lantern is removed. Partitions B and B' form, with the walls of the casing, a dark chamber $b$ within the same, and a plate $d$ below the bottom of the chamber is provided to furnish bearings for the gearing.

Rolls $a$ are provided in each corner of the dark chamber to sustain and drive the endless film $e$, and a series of take-up rolls $t$ is mounted within the chamber in the rear of the aperture $A^2$ to sustain the film between the adjacent rolls $a$. One of the rolls $t$ is shown in Figs. 3 and 4 provided with a movable foot $t^2$, adjusting screw $t^4$ and clamping screw $t^3$ to tighten the film when applied to the rolls.

The front of the partition B is provided with an aperture C to admit light to the film $e$, and a tube D' carrying a photographic lens D is fitted movably to such partition by a foot $D^2$ arranged to cover the aperture C. The foot $D^2$ is fitted to rabbeted guides $w$.

The film is sustained at a level with the aperture C by means of collars $t'$ upon the various rolls, and is held close to the inner end of the tube D' by guide rolls $s$; and the lens may thus be adjusted to photograph several series of pictures upon different paths in the width of the film.

Holes I are formed in the front $A^3$ of the casing in line with the center of the lens when adjusted in its several positions, and a rotary shutter-disk E having slot E' is arranged to revolve between the lens and the holes I.

A spring barrel $m$ is fixed between the plate $d$ and partition B' and its spindle is provided below the plate $d$ with the ratchet wheel $m'$ and crank $m^2$ for winding up the spring. A door $m^5$ is shown in the bottom of the casing to provide access to the crank. The inner end of the spring spindle is sustained by a bracket bearing $m^3$. The rolls $a$ are provided below the partition B' with pinions $g$ which are connected with the gear $g^2$ upon the spindle of the spring barrel by gear wheels $g'$, and a pinion $l$ upon the shutter E is connected in like manner with the spring barrel by a train of gearing lettered $l'$. A fan governor $y$ is provided to regulate the speed of the mechanism, and is shown driven by bevel gears from the train of gearing $l'$ connecting the wheel $l$ affixed to the disk E with the cog wheel $g^2$ affixed to the spring drum $m$. The rotation of the rolls $a$ operates to move the film at a uniform rate of speed past the aperture C, while the rotation of the shutter admits the light intermittingly to the film and, with a properly sensitized film, produces a series of instantaneous pictures of any object toward which the holes I are directed.

The foot $D^2$ of the lens tube D' is arranged to cover the whole of the aperture C excepting the portion through which the tube D' projects toward the film; while the guide rolls s closely embrace the film at opposite sides of the aperture so as to limit the exposure in the desired degree.

The gearing which connects the feed rolls a and the shutter E is so proportioned that the film is moved past the lens tube the exact width of the aperture C at each rotation of the shutter, and as the slot in the shutter admits the light for a short period only at each revolution, the exposure of the film is practically instantaneous.

Where twenty pictures a half inch square are photographed in each second, the film advances ten inches per second and the shutter makes twenty revolutions in the same space of time, which is equal to twelve hundred revolutions of the shutter per minute and a speed of fifty feet per minute for the film.

The lens is shown in Fig. 3 set in line with the lower portion of the film, and a series of pictures would thus be photographed in a path adjacent to its lower edge. By shifting the lens upward into a line with the middle hole I, another series of pictures could be photographed in a path along the middle of the film; and subsequently by moving the lens upward still farther a third series could be photographed in a path along the upper edge of the film. When the film has been fully exposed, it may be removed from the dark chamber in a dark closet and properly developed, after which a positive may be printed from such negative by means already well known.

As the apparatus is adapted to be transformed into a magic lantern, I have indicated a lantern H in position, in Fig. 3, with air tubes r and v and chimney q; and have shown also, in Figs. 2 and 3, a hood h attached to the front of the casing by a slide h' and provided with a ground glass screen $h^2$, but such hood would be removed in using the apparatus as a camera for which it is specially designed.

The endless film may be made of any width which it is practicable to handle, and several series of pictures may thus be taken upon the same film with a great saving in time and labor; in developing, in printing the positive therefrom and adjusting the same to the apparatus.

An adjustable presser roll a' is shown in the lower corner of Fig. 4 with the film conducted between the same and one of the feed rolls a. By making such rolls of india-rubber or other soft material, the film may be grasped and propelled with the required certainty and the necessity for driving any of the other rolls may be avoided.

It is immaterial how the feed rolls be driven or connected with the rotary shutter E. The entire apparatus may be made of the same size as an ordinary portable detective camera, and obviously affords a portable means of recording the movements of men in action, or of recording the appearance of any other moving objects.

From the above description it will be seen that the apparatus embodies all the advantages of a camera and also admits, when required, of transformation into an instrument for reproducing the series of pictures thus taken.

The specific means for transforming the apparatus is not claimed herein, but I have restricted my present claims to the organization for photographing the pictures, and for admitting a lantern within the camera.

Having thus set forth the invention, what I claim herein is—

1. In a camera, the combination, with a suitable lens, of means for supporting and propelling a sensitized film past the same, means for holding the lens movably whereby it may be set successively to expose different paths upon the film, and a shutter mounted upon a fixed bearing and consisting of a revolving disk having a radial slot therein adapted to uncover the lens intermittingly in each of its several positions, substantially as herein set forth.

2. In a camera, the combination, with the casing A, of the partitions B B' forming with the casing the dark chamber b with aperture C having lens D applied thereto, and the casing having the aperture I adjacent to the lens, feed rolls in the chamber b to support and propel a sensitized film adjacent to the aperture C, the slotted shutter disk E provided with pinion l and pivoted adjacent to the aperture I, the spring barrel m with gearing to rotate the feed rolls, and the gearing l' connecting the spring barrel with the shutter, the whole arranged and operated as herein set forth.

3. In a camera, the combination, with the casing A, of the partitions B B' forming with the casing the dark chamber b, with aperture C having lens D applied thereto, and the casing having the aperture I adjacent to the lens, feed rolls in the chamber b to propel a sensitized film adjacent to the aperture C, the shutter disk E provided with the pinion l and pivoted adjacent to the aperture I, the spring barrel m with gearing to rotate the feed rolls, the gearing l' connecting the spring barrel with the shutter, and a governor connected with the gearing to regulate the speed of the same, substantially as herein set forth.

In testimony whereof I have hereunto signed my name in the presence of two subscribing witnesses.

JAMES E. BLACKMORE.

Witnesses:
GEO. W. ROE,
THOMAS S. CRANE.